United States Patent
Bonnet et al.

(10) Patent No.: US 7,025,093 B2
(45) Date of Patent: Apr. 11, 2006

(54) POLYURETHANE ELASTOMER GEL INSULATING COMPOSITION AND USE THEREOF

(75) Inventors: Evelyne Bonnet, La Morlaye (FR); Laurent Martin, Tokyo (JP); Helene Egret, Rouen (FR)

(73) Assignee: Atofina, Putueaux (FR)

( * ) Notice: Subject to any disclaimer, the term of this patent is extended or adjusted under 35 U.S.C. 154(b) by 144 days.

(21) Appl. No.: 10/415,625

(22) PCT Filed: Oct. 26, 2001

(86) PCT No.: PCT/FR01/03339

§ 371 (c)(1),
(2), (4) Date: Sep. 8, 2003

(87) PCT Pub. No.: WO02/34809

PCT Pub. Date: May 2, 2002

(65) Prior Publication Data

US 2004/0026653 A1     Feb. 12, 2004

(30) Foreign Application Priority Data

Oct. 27, 2000   (FR)   .................................. 00 13809

(51) Int. Cl.
*F16K 17/36*    (2006.01)
*F16K 17/38*    (2006.01)
*F16L 9/00*     (2006.01)
*F16L 9/14*     (2006.01)
*F16L 7/00*     (2006.01)

(52) U.S. Cl. ........................ 138/149; 137/79; 137/81.2; 137/375; 138/140; 138/177; 428/35.9; 428/36.8; 428/423.1; 524/474; 524/484; 524/485; 524/486; 524/490; 524/491; 524/589; 524/590

(58) Field of Classification Search ................ 524/589, 524/590, 474, 484, 485, 486, 490, 491; 428/35.9, 428/36.8, 423.1; 138/140, 149, 177; 285/47; 137/79, 81.2, 375

See application file for complete search history.

(56) References Cited

U.S. PATENT DOCUMENTS

| RE30,321 E | * | 7/1980 | Brauer et al. ........... 260/18 TN |
| 4,824,705 A | | 4/1989 | Persson et al. |
| 5,872,183 A | * | 2/1999 | Bonnet et al. ................ 525/66 |

FOREIGN PATENT DOCUMENTS

| EP | 0 222 634 A1 | 5/1987 |
| JP | 58196227 | 11/1983 |

* cited by examiner

*Primary Examiner*—Patrick D. Niland
(74) *Attorney, Agent, or Firm*—Cozen O'Connor, P.C.; Michael B. Fein

(57) ABSTRACT

The invention relates to the use of a thermally insulating composition in the form of crosslinked polyurethane elastomer gel, obtained by reacting at least one polyol and at least one polyisocyanate in the presence of at least one inert organic filler, for the thermal insulation of pipeline systems present in a product-transfer conduit.

29 Claims, No Drawings

POLYURETHANE ELASTOMER GEL INSULATING COMPOSITION AND USE THEREOF

CROSS REFERENCE TO RELATED APPLICATION

This is a national stage application (filed under 35 U. S. C. 371) of International Application PCT/FR01/03339.

The present invention relates to the field of thermal insulation, particularly to thermal insulation of conduits for transport or transfer of materials. It describes the use of an insulating composition in the form of a crosslinked polyurethane elastomer obtained by reacting a polyol and a polyisocyanate in the presence of an organic filler chemically inert to isocyanates, this filler preferably being at least one thermally insulating liquid.

The present invention finds its application in technical fields which use conduits or pipeline systems for transferring, evacuating or transporting materials which are liquid and relatively viscous, where it is necessary to maintain the temperature of the materials during their transport or to limit the heat losses, or to heat the transport conduits if shutdown occurs. An example which may be cited is the field of transport of petroleum products from a land-based or submarine well, of hot-water conduits for district heating, of conduits for heating or cooling industrial lines, the field of air conditioning and installations needing the maintenance of high or low temperature, and buildings insulation.

In these fields there are often problems of heat exchange and of maintaining the temperature of the transported products. This is because poor insulation can cause a variety of disadvantages. For example, viscous products are transported at relatively high temperature. Poor insulation combined with a lower-temperature environment brings about a lowering of temperature, an increase in the viscosity of the transported product, a slowing of flow rate, which can even result in deposition, or gelling and plugging of the conduit, with serious consequences if shutdown of production results.

It may also be noted that an increase in the temperature of a transported product can irreparably impair the properties of this product and possibly cause its total degradation, or if volatile products are being transported, can create increases in pressure and risk of damage to the conduits, and explosion risk.

It is therefore necessary to provide thermal insulation for conduits serving for the transport or the transfer of materials, in particular relatively viscous liquid materials, by using insulating materials which are easy to process at the actual point of application, in particular easy to mould between the walls of the sheath and of the conduit, with good adhesion and good impermeability of the assembly and with high compressive strength performance, more particularly under the conditions of transport through submarine pipes at great depth.

To resolve the abovementioned problems, the applicant's invention proposes insulating the conduits with the aid of a thermally insulating polyurethane gel obtained by reacting at least one polyol with at least one polyisocyanate, in the presence of at least one organic filler chemically inert to isocyanates, the said organic filler preferably being based on at least one thermally insulating liquid.

This follows from the applicant's finding that insulation with this type of gel provides a means of:
obtaining very low λ (lambda: thermal conductivity) with high compressive strength. This is not the case with elastomers filled with solid materials, such as hollow glass beads, fibres, cork, etc. The behaviour of the gel is actually close to that of an incompressible liquid providing ready capability for modifying modulus of elasticity or density
providing increased ease of processing by methods such as injection moulding or premoulding
manufacturing transfer conduits which are relatively flexible, thermally insulated, and capable of being rolled up onto reels, with completely satisfactory adhesion of the moulded insulating material and assured impermeability of the assembly.

The transport conduit may have various forms, but is preferably tubular, like the sheath around the transport conduit. Both the transport conduit and the outer sheath may be made of metal, such as iron, steel, copper, aluminium, or metallic alloys, but may also be made of synthetic polymers, such as polypropylene, polyethylene, PVC, polyamides, polyurethanes, or any other polymer convertible into pipes, sheets, or sheathing. The abovementioned option of sheathing made of polymers is an option rendered more practical and effective by the fact that the solution of the invention, which permits a gel to be obtained whose incompressibility performance is equivalent to that of a liquid, permits the use of sheathing materials which are less rigid, lighter in weight, and less difficult to process, and which consequently incur lower total costs.

The outer sheath may preferably be a thick, relatively rigid layer of thickness from a few millimetres to some centimetres, but may also take the form of a flexible or semi-rigid film.

The free space between the transport conduit and the outer sheath, where the insulating gel will be applied, may be variable, and its specification depends on the desired degree of insulation, calculated from the insulation factor of the gel and from the temperatures to be maintained.

Other insulating materials may be used in combination with the insulating gel, by superposing or intercalating various insulation layers.

It is possible to combine the polyurethane gel with an insulating foam, such as rigid insulating polyurethane foams, syntactic foams, polyolefin foams, expanded polystyrene or mineral insulating materials, such as glass fibre or rock fibre. These compact or expanded materials may make up the outer sheath, inside which there is the gel applied onto this transport conduit. Compared with these standard insulating materials, the minimum and essential advantage of the insulating gel of the present invention is compressive strength. All the standard insulating materials have the disadvantage of crushing under compression unless they have the protection of a rigid sheath surrounding the insulating material.

Another advantage of the invention is the capability of using the composition in liquid form at the actual points of use, or in the form of premoulded crosslinked gel.

For example, before its crosslinking and conversion into gel, the liquid may be poured or injected between the transport conduit and the outer sheath, the crosslinking taking place in situ, but the insulating material may also be applied in the form of premoulded crosslinked gel, in the form of sheets, of tapes or of mouldings of dimensions defined by the insulation objective to be achieved.

The advantage of the composition of the invention in the form of gel, other than very good thermal insulation performance, is the ability of the gel to fill all the empty spaces and interstices, to adhere to numerous substrates by exhibiting tack, to deform under stress, distributing pressure, with behaviour equivalent to that of an incompressible liquid. The gels described in the invention have very good elastic recovery and regain their initial shape once the stresses are removed. Resistance to high pressures and ease of processing in situ at the actual point of use are particular advantages for the thermal insulation of submarine transport conduits.

The elastomeric gels of the invention provide not only insulation but impermeability to liquids and gases.

The present invention therefore provides the use of a thermal insulation composition in the form of an insulating gel for insulating pipeline systems present in a product-transfer conduit. The insulating gel is obtained from a crosslinkable composition comprising at least one polyol, at least one polyisocyanate and at least one chemically inert organic, preferably liquid, filler.

The crosslinkable insulating composition according to the present invention therefore comprises at least one polyol, at least one polyisocyanate of functionality $\geq 2$, optionally a crosslinking catalyst and a sufficient quantity of at least one chemically inert organic, preferably liquid, filler.

After crosslinking, the composition according to the present invention is a low-exudation or zero-exudation homogeneous rubbery solid.

According to the present invention, use is made of an organic filler chemically inert to polyisocyanates, its weight being greater than 20% by weight, preferably from 50 to 95%, and more preferably from 60 to 90% by weight, of the entirety of the crosslinkable insulating composition.

According to the present invention, the organic filler chemically inert to polyisocyanates is an insulating liquid compatible with polyols and polyisocyanates. This insulating liquid filler may be chosen among plasticizers, such as oils, resins and hydrocarbon derivatives, hydrocarbons and fuels, alkylbenzenes and liquid esters.

It is more particularly chosen among:
1) Amorphous or semicrystalline paraffins (of melting point $\leq 50°$ C.), including animal waxes, vegetable waxes (such as candelilla or carnauba primarily composed of a mixture of aromatic and aliphatic esters), mineral paraffins and synthetic paraffins (polyethylene waxes, chlorinated paraffins, etc.). Those of most interest for the invention are the "mineral" paraffins: petroleum derivatives. They consist mainly of n-alkanes. The paraffins are microcrystalline, brittle and composed of 40–90% by weight of normal paraffins, the remainder consisting of $C_{18}-C_{36}$ cycloalkanes and isoalkanes. They are obtained by distillation of crude oil. This is generally followed by decolorizing by hydrogenation or percolation. They are more preferably chosen among paraffins: $C_{18}-C_{20}$ n- or isoparaffins and mixtures thereof or chlorinated paraffins. Typical examples of paraffins are:
n-heptadecane, n-octadecane, n-nonadecane, n-eicosane, n-heneicosane, n-docosane and mixtures of these paraffins, for example LINPAR 18–20 from the company CONDEA
2) Naphthenic oils or resins, more particularly the $C_5-C_{12}$ representatives: naphthenic oils are also petroleum derivatives, and are hydrogenated liquid $C_5-C_{12}$ derivatives, since a mineral oil consists of paraffins, naphthenes, aromatics and polyaromatics. As described above, the paraffins are n-alkanes or branched alkanes. The naphthenic structure is actually that of a cycloalkane having at least one ring of 6 carbon atoms (or even 5 or 7). Finally, in aromatic derivatives a distinction is made between aromatics and polyaromatics. A distinction is generally made between two types of crude oils: naphthenic oils and aromatic oils. The product NYFLEX 820 from NYNAS is a typical example of a naphthenic oil. It has a proportion of 16% of aromatics.

3) Heavy and light fuels, and more particularly kerosene, diesel, etc. This family of products is more particularly preferred.
4) Alkylbenzenes, such as decylbenzenes, dodecyl benzenes.
5) Esters which are, for example, products of reacting polyhydric alcohols, such as pentaerythritol, with monobasic carboxylic acids, such as n-heptanoic acid; alkyl phthalates, such as diethyl and dibutyl phthalate.
6) Alkylpolyaromatic compounds, such as: the mixture of isomers of dibenzyltoluene (DBT), monoisopropylbiphenyl (MIPB), phenylxylylethanes (PXE); mixtures of benzyltoluenes and dibenzyltoluenes, such as those described particularly in European Patent No. 136230-B1; mixtures of mono- and bis(methylbenzyl)xylenes, such as those described in European Patent Application No. 0500345; mixtures of benzyltoluene and of diphenylethane.
7) Vegetable oils, such as rapeseed oils and maize oils, and also combinations of at least two of the abovementioned insulating liquids.

The chemically inert organic filler used preferably comprises naphthenic oils or n-paraffins or a mixture of n-paraffins, or comprises fuels. Fuels are more particularly preferred, and even more preference is given to aviation fuels, such as kerosene.

According to the present invention, the polyisocyanate used may be chosen among aromatic, aliphatic and cycloaliphatic polyisocyanates and those whose molecule contains an isocyanurate ring, having at least two isocyanate functions in their molecule, and susceptible to reaction with the hydroxyl functions of a polyol to form a three-dimensional polyurethane network, bringing about the crosslinking of the composition.

By way of illustration of aromatic polyisocyanates which may be used according to the present invention, mention is made of diphenylmethane 4,4'-diisocyanate (MDI), polymeric MDIs, and triphenylmethane triisocyanate.

By way of illustration of an aliphatic polyisocyanate which may be used according to the present invention, mention is made of the biuret of hexane 1,6-diisocyanate.

By way of illustration of cycloaliphatic polyisocyanates, mention is made of isophorone diisocyanate (IPDI), cyclohexyl diisocyanate (CHDI), and dicyclohexylmethane 4,4'-diisocyanate.

Use may also be made of a polyisocyanate polymer whose chain contains at least two units each of which contains at least one isocyanate function.

The polyisocyanate polymer used advantageously comprises the product of formula:

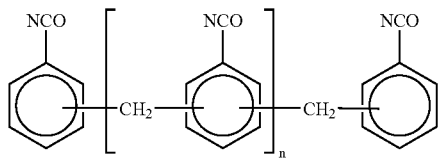

CAS Reg. Number (CHEMICAL ABSTRACTS registry No.): 9016-87-9 known as PMDI.

The amount of polyisocyanate according to the present invention is chosen in such a way that the molar ratio NCO/OH is between 0.5 and 2, preferably from 0.65 to 1.20.

According to the present invention, the polyol is chosen among polydiene polyols, polyester polyols, and polyether polyols, taken separately or in a mixture.

According to the present invention, the polydiene polyol is preferably a hydroxytelechelic oligomer of conjugated dienes and may be obtained by various processes, such as free-radical polymerization of conjugated dienes having from 4 to 20 carbon atoms in the presence of a polymerization initiator, such as hydrogen peroxide or an azo compound, such as azobis-2,2-[2-methyl-N-(2-hydroxyethyl) propionamide] or anionic polymerization of a conjugated diene having from 4 to 20 carbon atoms in the presence of a catalyst, such as naphthalenedilithium.

According to the present invention, the conjugated diene of the polydiene polyol is chosen from the group consisting of butadiene, isoprene, chloroprene, 1,3-pentadiene and cyclopentadiene.

The scope of the invention covers the use of hydroxytelechelic oligomers of conjugated dienes epoxidized along the chain, and also of hydrogenated hydroxytelechelic oligomers of conjugated dienes.

According to the present invention, the polydiene polyols may have number-average molecular weights of at most 7 000 and preferably between 1 000 and 3 000. They have functionalities of from 1 to 5, preferably from 1.8 to 3, and a dynamic viscosity, measured at 30° C., of not less than 600 mPa.s.

By way of illustration of polydiene polyols, mention is made of the hydroxylated polybutadienes marketed by the company ATOFINA with the names Poly Bd® R 45 HT and Poly Bd® R 20 LM.

According to the present invention, the composition may comprise one or more low-molecular weight polyols in addition to the polyol(s) mentioned.

A low-molecular weight polyol is a polyol having a molecular weight of from 50 to 800.

By way of illustration of polyols of this type, mention may be made of ethylene glycol, propylene glycol, diethylene glycol, dipropylene glycol, polyether polyols, 1,4-butanediol, 1,6-hexanediol, 2-ethyl-1,3-hexanediol, N,N-bis (2-hydroxypropyl)aniline, 3-methyl-1,5-pentanediol, trimethylolpropane, pentaerythritol, the propoxylated bisphenol A marketed by the company AKZO with the name DIANOL 320 and mixtures of at least two abovementioned polyols.

If use is made of a low-molecular weight polyol, the molar ratio NCO/OH has to be calculated taking into account the hydroxyl functions borne by the said low-molecular weight polyol.

If use is made of a crosslinking catalyst, this may be chosen from the group consisting of tertiary amines, imidazoles and organometallic compounds.

By way of illustration of tertiary amines, mention may be made of 1,4-diazabicyclo[2.2.2]octane (DABCO), and N,N, N',N'',N''-pentamethyldiethylenetriamine.

By way of illustration of organometallic compounds, mention may be made of dibutyltin dilaurate, dibutyltin diacetate, and organic derivatives of bismuth.

The crosslinkable composition of the present invention may be obtained by mixing the various constituents using any means of agitation sufficient to provide good dispersion of the constituents. The components may be heated, if necessary, to improve homogenization. The composition may comprise one or more additives, such as antioxidants or corrosion inhibitors.

The crosslinkable composition of the invention has the advantage of providing thermal insulation to the pipeline system(s) passing through the conduit, by virtue of its low thermal conductivity, and of preventing any convection. In addition, taking into account the resistance of the composition of the present invention to hydrostatic pressure, it may very particularly be used for the thermal insulation of pipeline systems present in a submarine transfer conduit. This is because the density of the crosslinkable composition of the invention may be adjusted so as to be close to or even lower than that of the water at the sea bed.

The crosslinkable composition of the invention, which is liquid when it is processed, has very low shrinkage during its crosslinking, and this permits provision of an interface of good quality between the gel and the pipeline systems to be jacketed, and complete filling of the spaces within the sheath in which the gel is present, with very good adhesion of this gel to the walls of the conduit and of the sheath.

To illustrate the invention, a description is given below of a transverse section of a conduit.

A conduit generally comprises:
a sheath which is generally made of steel and may be externally coated with an anticorrosion coating;
various pipeline systems conveying the products, optionally a pipeline system known as a service pipeline system, where these pipeline systems may have been externally coated with an anticorrosion coating, and
a space filled by the filling material which consists of the crosslinkable insulating composition of the invention.

The crosslinkable insulating composition may be put in place by any appropriate means.

In particular, in one embodiment of the invention it is possible for a crosslinkable composition which has been previously prepared and has fluidity sufficient to permit the complete filling of the sector comprising the pipeline(s) to be injected into the said sector. The composition preferably has a viscosity lower than 200 mPa.s at the temperature of processing, which is not more than 80° C.

The said composition is then allowed to crosslink. The crosslinked insulating composition is characterized by thermal conductivity γ (lambda) lower than 0.25 W/m.k.

The setting time, which is the time necessary for the composition according to the present invention to be completely crosslinked, may vary within a wide range.

However, this setting time has to be adjusted in such a way that the composition according to the present invention can completely fill the (submarine) conduit and can completely satisfactorily wet the pipeline system(s) inside the said conduit to provide their insulation.

The person skilled in the art will therefore adjust the proportions of the constituents of the said composition and, optionally, the amounts of crosslinking catalyst are to be used to obtain a suitable setting time.

The composition of the present invention may also be used for completing the thermal insulation of pipelines where there is already a primary coating of insulation.

Secondly, the present invention provides a submarine product-transfer conduit comprising at least one pipeline system, optionally at least one pipeline system known as a service pipeline system, one protective tubular sheath through which the said pipeline systems pass and a filling made of a thermally insulating material physically characterized in that the thermally insulating material consists of an insulating composition in the form of a gel obtained from a crosslinkable composition as defined for the use according to the present invention.

Thirdly, the present invention provides a district heating conduit comprising at least one PVC pipeline system, transporting hot water from the thermal power station to the housing, a tubular protective sheath made of plastic, PVC or polyethylene, through which the said pipeline systems pass, and a filling made of a thermally insulating material, physically characterized in that the thermally insulating material consists of an insulating composition in the form of a polyurethane elastomer gel as defined for the use according to the present invention.

Fourthly, the present invention provides a process for thermal insulation of a conduit for transporting liquid materials, obtained from a crosslinkable insulating composition as defined for the use according to the present invention, the said process comprising the following steps:

a) Intimate mixing of the polyol component and of the insulating liquid filler component of the said insulating composition, b) Addition, to the mixture of step a), of the polyisocyanate component of the said insulating composition, with intimate mixing of all of the components, c) Casting or injection moulding of the resultant mixture from step b) into the interstitial space formed between the outer surface of the conduit and the inner surface of the protective sheath, d) Crosslinking and solidification in situ to obtain the thermally insulated conduit ready for use at its point of use.

One version of this process consists in implementing steps c) and d) in a mould to obtain premoulded sections of thermal insulation for a materials-transport conduit, with assembly around the conduit.

Finally, the present invention provides premoulded sections of thermal insulation for a conduit which have been obtained according to the said version of the process, prior to assembly around the conduit.

Below we give some illustrative embodiments of crosslinkable compositions which may be used according to the present invention.

The compositions were prepared using the following constituents:

Poly Bd® 45 HT (termed Poly Bd® below): hydroxylated polybutadiene of number-average molar mass Mn of 2 800 (determined by steric exclusion chromatography) with a hydroxyl index $I_{OH}$ expressed in milliequivalents per gram of resin (meq/g) of 0.83, viscosity of 5 000 mpa.s at 30° C. and density of 0.90.

A mixture of n-paraffins, the main component being n-octadecane (LINPAR 18–20 from CONDEA).

A naphthenic resin, Nyflex 820 grade, produced and marketed by NYNAS.

A prepolymer such as UREFLEX MU 55 marketed by Baulé.

Isonate M 143 (termed Isonate below) marketed by the company DOW CHEMICAL: polymeric MDI having an NCO content of 29.16%, functionality of 2.2 and viscosity of 130 mPa.s at 20° C.

Dibutyltin dilaurate (crosslinking catalyst) termed DBTL below (FASCAT 4220CL).

"No Air" liquid antifoam marketed with this name by the company BARLOCHER.

EXAMPLES

The following examples illustrate the invention without limiting its scope.

1. Formulations:

Some examples of formulations prepared are given in the following table:

|  | Composition 1 | Composition 2 | Composition 3 | Composition 4 | Composition 5 |
|---|---|---|---|---|---|
| Poly Bd R 45 HT | 100 | 100 | 100 | 100 | 100 |
| N-paraffin mixture with n-octadeoane >60% LINPAR from CONDEA | 250 | | | | |
| Kerosene (Kedrul 212 from TOTALFINAELF) | | | 200 | 200 | 500 |
| NYFLEX 820 | — | 200 | | | |
| FASCAT 4220 CL (Dibutyltin dilaurate) | 0.1 | 0.025 | 0.1 | 0.1 | 0.1 |
| "No Air" liquid | — | 0.5 | 0.5 | 0.5 | 0.5 |
| Isonate N 143 % NCO = 29.16 | 12.7 | — | | 12.7 | 12.7 |
| Ureflex MU 55 % NCO = 5.25 | | 47.04 | 47.04 | | |
| NCO/OH | 1.05 | 0.7 | 0.7 | 1.05 | 1.05 |

Method:

Composition 1:

The mixture Poly Bd R 45 HT/LINPAR 18–20 paraffin is degassed at 80° C. for 1 hour under vacuum. The mixture is then cooled to 50° C. for addition of the isocyanate Isonate M 143 and then left to crosslink at 50° C.

Composition 2:

The mixture Poly Bd R 45 HT/NYFLEX 820 is degassed for 1 hour under vacuum at ambient temperature. The polyisocyanate prepolymer is then added and the crosslinking takes place at ambient temperature.

Compositions 3–5:

Poly Bd R 45 HT and kerosene are mixed with stirring at ambient temperature. The polyisocyanate prepolymer is then added and the crosslinking takes place at ambient temperature.

2. Thermal conductivity measurements:

The tests were carried out on FOX series 300 (DELTA) or SOFT-K thermal conductivity measurement equipment conforming to ASTM C518 and ISO 2581. The measurements were made on specimens of size 30×30×2 cm placed between the upper segment (cold plate) and the lower plate (hot plate) of the equipment.

The results are given in the following table:

|  | Cold plate/hotplate Temp. ° C. | Composition 1 | Composition 2 | Composition 3 | Composition 4 | Composition 5 |
|---|---|---|---|---|---|---|
| Lambda at 10° C. W/m.k. | 0° C./20° C. | 0.1276 | 0.136 | | 0.139 | 0.125 |
| Lambda at 25° C. W/m.k. | 10° C./40° C. | | 0.1385 | 0.115 | 0.135 | 0.128 |

3. Conclusion:

The values obtained for thermal conductivity demonstrate the effectiveness of the crosslinkable compositions of the invention in thermal insulation.

What we claim is:

1. District heating conduit comprising at least one PVC pipeline system transporting hot water from a thermal power station to a housing, a tubular protective sheath made of a plastic, PVC or polyethylene through which the said PVC pipeline system passes, and a filling made of a thermally insulating material, wherein the thermally insulating material consists of an insulating composition in the form of a polyurethane elastomer gel composition prepared by reacting a crosslinkable composition comprising at least one polyol and at least one polyisocyanate in the presence of at least one liquid organic filler chemically inert to the polyisocyanates.

2. Process for thermal insulation of a conduit for transporting materials, the conduit having an outer surface and a protective sheath, the protective sheath having an inner surface, an interstitial space between the outer surface of the conduit and the inner surface of the protective sheath comprising a) intimately mixing of at least one polyol component and at least one insulating inert liquid organic filler component chemically inert to polyisocyanates b) adding to the mixture of step a) at least one polyisocyanate component with intimate mixing of all of the components, c) casting or injection moulding of the resultant mixture from step b) into the interstitial space and d) crosslinking and solidification in situ to obtain the thermally insulated conduit ready for use at its point of use.

3. Process according to claim 2 in which the steps c) moulding and d) crosslinking are implemented in a mould to obtain premoulded sections of thermal insulation for the conduit for transporting liquid materials, and comprising an additional step e) assembling these premoulded sections around the conduit.

4. Premolded sections of thermal insulation for a conduit which have been obtained by the process of claim 2.

5. The method according to claim 2, wherein the said organic filler is kerosene.

6. Conduit for sub-marine product transfer, comprising at least one pipeline system, optionally at least one pipeline system known as a service pipeline system, having a protective tubular sheath through which the said pipeline system passes and a filling made of a thermally insulating material, wherein the thermally insulating material consists of an insulating composition in the form of a gel obtained from a crosslinkable composition comprising at least one polyol and at least one polyisocyanate in the presence of at least one liquid organic filler chemically inert to the polyisocyanates.

7. The process according to claim 2, wherein the inert liquid organic filler is more than 20% by weight of the entire composition.

8. The process according to claim 2, wherein the inert liquid organic filler represents from 50 to 95% by weight of the entire composition.

9. The process according to claim 2, wherein the inert liquid organic filler is selected from the group consisting of
$C_{18}$–$C_{20}$ n- or iso-paraffins, chlorinated paraffins; heavy or light fuels; $C_5$–$C_{12}$ naphthenic oils or resins; aromatic compounds and polyaromatic compounds, optionally containing one or more heteroatoms.

10. The process according to claim 2, wherein the inert liquid organic filler is an n-paraffin or a mixture of n-paraffins.

11. The process according to claim 2, wherein the inert liquid organic filler is a naphthenic resin.

12. The process according to claim 2, wherein the inert liquid organic filler is an aviation fuel.

13. The process according to claim 2, wherein the polyol is selected from the group consisting of polyester polyols, polyether polyols and polydiene polyols.

14. The process according to claim 2, wherein the inert liquid organic filler is an optionally substituted aromatic or polyaromatic compound, optionally containing one or more heteroatoms.

15. The process according to claim 2, wherein at least one polyol is polydiene polyol having a number-average molecular weight of no greater than 7 000, and a functionality of from 1 to 5.

16. The process according to claim 15, wherein the polydiene polyol has a number-average molecular weight of about 1000 to 3000.

17. The process according to claim 15, wherein the polydiene
polyol is a hydroxytelechelic oligomer of a conjugated diene.

18. The process according to claim 15, wherein the polyol has a number-average molecular weight of about 1000 to 3000.

19. The process according to claim 15, wherein the polydiene polyol is a hydroxytelechelic oligomer of butadiene.

20. The Process according to claim 2, wherein the polyisocyanate is an aromatic, cycloaliphatic, or a prepolymer.

21. The process according to claim 2, wherein the polyisocyanate is diphenylmethane 4,4'-diisocyanate (MDI) or a polymeric MDI.

22. The process according to claim 2, wherein the polyisocyanate is a prepolymer prepared from a hydroxytelechelic oligomer of a conjugated diene, polyol and a polyisocyanate.

23. The process according to claim 2, wherein the polyol comprises one or mare low-molecular weight polyols.

24. The process according to claim 23, wherein the low-molecular weight polyol(s) has (have) a molecular weight of from 50 to 800.

25. The process according to claim 2, wherein the NCO/OH molar ratio is between 0.5 and 2.

26. The process according to claim 2, wherein the NCO/OH ratio is between 0.65 and 1.20.

27. The process according to claim 2, comprising adding a crosslinking catalyst to the mixture.

28. The process according to claim 27, wherein the said crosslinking catalyst is dibutyltin dilaurate.

29. The process according to claim 2, the insulation having, after crosslinking, a thermal insulation factor below 0.25 W/m.k.

* * * * *